United States Patent [19]

Rotter

[11] Patent Number: 4,478,326
[45] Date of Patent: Oct. 23, 1984

[54] CLUTCH PLATE

[75] Inventor: Gerhard Rotter, Obersasbach, Fed. Rep. of Germany

[73] Assignee: Luk Lamellen und Kupplungsbau GmbH, Bühl, Fed. Rep. of Germany

[21] Appl. No.: 376,623

[22] Filed: May 10, 1982

[30] Foreign Application Priority Data

May 29, 1981 [DE] Fed. Rep. of Germany ....... 3121375

[51] Int. Cl.³ .............................................. F16D 3/14
[52] U.S. Cl. ............................... 192/106.2; 192/70.17; 464/68
[58] Field of Search ............... 192/70.17, 106.1, 106.2; 464/66, 68, 81

[56] References Cited

U.S. PATENT DOCUMENTS

| | | | |
|---|---|---|---|
| 2,613,515 | 10/1952 | Crutchley | 192/106.2 |
| 3,802,541 | 4/1974 | Schneider | 192/70.17 |
| 3,931,876 | 1/1976 | Beeskow et al. | 192/106.2 |
| 4,036,341 | 7/1977 | Beeskow et al. | 192/106.2 |
| 4,044,874 | 8/1977 | Worner | 192/106.2 |

*Primary Examiner*—Rodney H. Bonck
*Assistant Examiner*—James J. Merek
*Attorney, Agent, or Firm*—Peter K. Kontler

[57] ABSTRACT

A clutch plate for use in the friction clutches of automotive vehicles has a rotary hub with two spaced-apart coaxial annular cheeks which flank the inner portion of an annular carrier for friction linings. The carrier can turn, within limits, relative to the cheeks against the opposition of coil springs which are inserted into registering windows provided therefor in the cheeks and in the carrier. A first friction generating unit operates continuously between the hub and the carrier, and such friction generating unit has two friction pads disposed at the opposite sides of the carrier immediately adjacent or close to the periphery of the hub, and a ring-shaped spring which reacts against one of the cheeks to urge one of the pads against the carrier which is movable axially to urge the other pad against the other cheek. A second friction generating unit surrounds the first unit and is designed to generate friction during certain stages of angular movement of the carrier relative to the cheeks or vice versa. The second unit has a ring-shaped friction generating component disposed at one side of the carrier and a resilient dished annular second component at the other side of the carrier. The latter has apertures for axially extending arms of the friction generating component, and such arms are engaged by the radially outermost portion of the second component.

15 Claims, 1 Drawing Figure

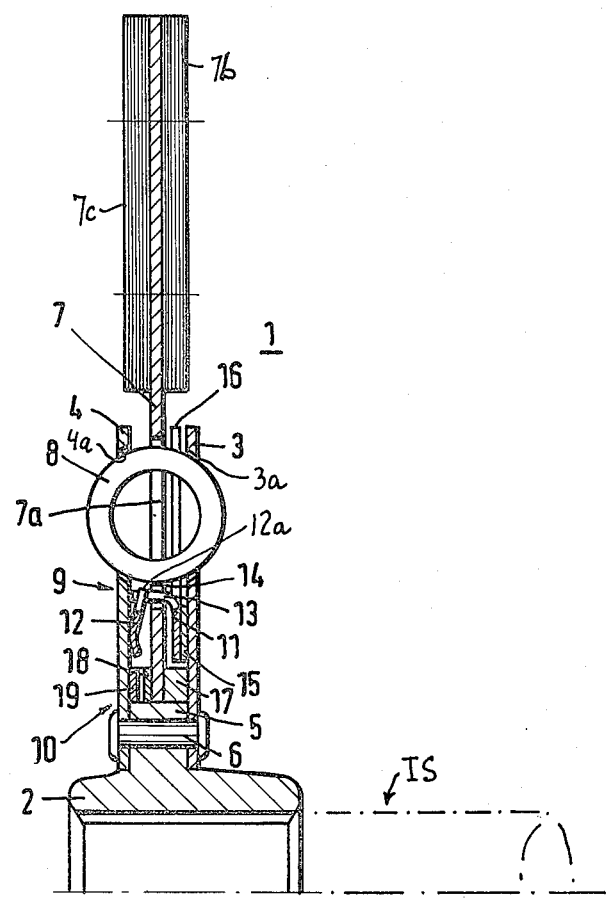

CLUTCH PLATE

BACKGROUND OF THE INVENTION

The present invention relates to friction clutches in general, and more particularly to improvements in clutch plates for use in friction clutches, especially in friction clutches of automotive vehicles.

It is already known to assemble the clutch plate of a friction clutch of two subassemblies which are rotatable, within limits, relative to one another against the opposition of coil springs or analogous energy storing elements. For example, one of the subassemblies may comprise a hub which can be non-rotatably secured to the input shaft of a change-speed transmission in an automotive vehicle and is provided with two spaced-apart coaxial annular discs or cheeks. The other subassembly can comprise a carrier for one or more friction linings; such carrier can constitute a flat washer-like body whose radially innermost portion extends into the space between the cheeks on the hub of the one subassembly. The carrier is rotatable by the flywheel on the crankshaft of the internal combustion engine in the automotive vehicle, and the aforementioned coil springs are inserted into registering windows which are provided in the cheeks and in the carrier so that they can yield, to a certain extent, to permit some angular displacement of the carrier relative to the hub and/or vice versa.

It is further known to provide a friction clutch of the above outlined character with a friction generating unit which is interposed in the path of power flow between the hub and the carrier, and to assemble such friction generating unit from a friction generating component and an axially stressed resilient component which latter biases the friction generating component. Reference may be had, for example, to German Pat. No. 2,436,288, and particularly to FIG. 5 of this publication. The two components of the friction generating unit are disposed at the opposite sides of the carrier and are connected to each other by distancing elements in the form of rivets. Still further, the friction generating unit which is disclosed in the German publication employs friction pads and a dished spring which urges the friction pads axially. Such dished spring and the friction pads are interposed between the carrier on the one hand and the aforementioned components of the friction generating unit on the other hand. A drawback of the patented clutch plate is that it is rather bulky and expensive. Furthermore, the patented construction does not invariably prevent rattling of its parts and/or the generation of other forms of noise.

OBJECTS AND SUMMARY OF THE INVENTION

An object of the invention is to provide a novel and improved clutch plate, particularly for use in friction clutches of automotive vehicles, which is simpler, more compact and less expensive than heretofore known clutch plates but is just as reliable as and generates less noise than conventional clutch plates.

Another object of the invention is to provide novel and improved friction generating means for use between the two relatively movable subassemblies of a clutch plate.

A further object of the invention is to provide a clutch plate wherein the friction generating means between the hub and the carrier of friction linings occupy little room, not only as considered in the axial direction but also as considered in the radial direction of the clutch plate.

An additional object of the invention is to provide a compact, simple and inexpensive clutch plate which can be used with advantage in many existing types of clutches as a superior substitute for heretofore known clutch plates.

Still another object of the invention is to provide a clutch plate wherein rattling of the carrier of friction linings relative to the hub is prevented or reduced in a novel and improved way.

Another object of the invention is to provide a novel and improved carrier of friction linings for use in a clutch plate of the above outlined character.

A further object of the invention is to provide the clutch plate with plural friction generating units which complement each other in such a way that at least one thereof invariably opposes angular movement of one subassembly of the clutch plate relative to the other subassembly and/or vice versa.

The invention is embodied in a clutch plate, particularly for use in the clutches of automotive vehicles, which comprises a rotary hub adapted to be non-rotatably secured to the input shaft of a change-speed transmission and having two spaced-apart coaxial annular disc-shaped cheeks, a friction lining carrier which is interposed between and is rotatable within limits relative to the cheeks (the carrier can be provided with two friction linings which receive torque from the flywheel of an internal combustion engine or the like), energy storing means (e.g., in the form of tangentially extending coil springs) which are installed in registering windows provided in the carrier on the one hand and in the cheeks on the other hand so that the hub can rotate relative to the carrier against the opposition of the energy storing means when the carrier transmits or begins to transmit torque to the hub and that the energy storing means returns the carrier to a predetermined angular position relative to the hub when the transmission of torque is terminated, a first friction generating unit which is interposed between the hub and the carrier, and a second friction generating unit which is interposed in the path of transmission of torque between the carrier and the hub. The second unit comprises an annular axially resilient component and a friction generating component. The resilient component can constitute a dished annular spring, and the two components are disposed at the opposite sides of the carrier and are in direct engagement with one another, i.e., the resilient component bears against the friction generating component. At least one of these components extends through the carrier, and the resilient component reacts against the hub, e.g., by reacting against one of the cheeks.

The outer portion of the resilient component (as considered in the radial direction of the hub) preferably bears against the friction generating component, and the inner portion of such resilient component then reacts against the one cheek of the hub. The one component (i.e., the component which extends through the carrier) is preferably the friction generating component. To this end, the carrier can be formed with apertures and the one component is then provided with suitably bent and configurated arms which extend through the apertures of the carrier so that the resilient component can bear against the arms of the one component. The arms can serve to non-rotatably couple the one component to the other component (to this end, the other component can have arms or otherwise configured projections which alternate with the arms of the one component).

The arrangement is preferably such that one of the cheeks is followed by the friction generating component, by the carrier, by the resilient component and by the other cheek, as considered in the axial direction of the hub. A friction pad can be interposed between the one cheek and the one component of the second friction generating unit.

The first friction generating unit can comprise at least one preferably annular friction pad and a preferably annular energy storing device (such as a dished spring). The components of the second friction generating unit preferably constitute annuli and the resilient component preferably surrounds the friction pad and/or the energy storing device of the first friction generating unit. The energy storing device of the first friction generating unit can constitute a resilient element which biases the pad axially of the hub. The pad is disposed between the carrier and one of the cheeks, and the components of the second friction generating unit preferably surround the first friction generating unit. The carrier is preferably movable axially of the hub (between the two cheeks), and the first friction generating unit then preferably comprises two friction pads which are disposed at the opposite sides of the carrier. The resilient element then urges one of the pads against the carrier and the latter urges the other pad against one of the cheeks, preferably against that cheek which is out of contact with the resilient component of the second friction generating unit. As mentioned above, the resilient element of the first friction generating unit can constitute an annular spring which reacts against one of the cheeks and biases the adjacent friction pad against the radially innermost portion of the carrier.

One of the components forming part of or constituting the second friction generating unit can be formed with one or more radially outwardly extending prongs or analogous means cooperating with the energy storing means between the cheeks and the carrier to return the one component to a predetermined angular position relative to the carrier under the action of the energy storing means when one of the parts including the hub and the carrier ceases to transmit torque to the other of these parts.

The novel features which are considered as characteristic of the invention are set forth in particular in the appended claims. The improved clutch plate itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary axial sectional view of a clutch plate which embodies one form of the invention and is intended for use in the friction clutch of an automotive vehicle.

DESCRIPTION OF THE PREFERRED EMBODIMENTS

The drawing shows a portion of a clutch plate 1 which comprises a hub 2 adapted to be non-rotatably mounted on a driven element IS, such as the input shaft of a change-speed transmission in an automotive vehicle. The hub 2 and its radially outwardly extending collar 5 constitute the output assembly of the clutch plate 1. This hub further comprises or carries two annular disc-shaped cheeks 3 and 4 which are spaced apart from one another, as considered in the axial direction of the hub. In the illustrated embodiment, the cheeks 3 and 4 are separately machined parts which are non-rotatably secured to the collar 5 by rivets 6 or analogous fastener means of which only one can be seen in the drawing. It will be noted that the radially innermost portions of the cheeks 3 and 4 flank the collar 5.

The input assembly of the clutch plate 1 comprises an annular disc-shaped carrier 7 for two friction linings 7b and 7c. The radially innermost portion of the carrier 7 extends into the space between the cheeks 3, 4 and is movable axially of the hub 2 along the peripheral surface of the collar 5. The carrier 7 is rotatable, within limits, relative to the hub 2 and vice versa. The means for limiting the extent of such relative angular movement between the input and output assemblies of the clutch plate 1 comprises several energy storing devices in the form of strong coil springs 8 (only one can be seen in the drawing) which extend into windows 7a of the carrier 7 and registering windows 3a, 4a of the respective cheeks 3, 4. When the clutch including the clutch plate 1 is in use, one of the friction linings 7b, 7c bears against and receives torque from the flywheel on the crankshaft of an internal combustion engine and the other friction lining is biased by a pressure plate in order to urge the one friction lining against the flywheel.

The coil springs 8 surround an outer (second) friction generating unit 9 which, in turn, surrounds an inner (first) friction generating unit 10. The arrangement is such that the inner friction generating unit 10 generates friction during each and every stage of relative angular movement of the carrier 7 and hub 2.

The outer friction generating unit 9 comprises a friction generating first annular component 11 at one side of the carrier 7 and a resilient second annular component 12 at the other side of the carrier. The component 12 is a dished spring whose radially innermost portion reacts against the inner side of the cheek 4 and whose radially outermost portion bears against the component 11. To this end, the carrier 7 is formed with an annulus of apertures 14 for projections or arms 13 which form part of the radially outermost portion of the component 11 and extend in parallelism with the axis of the hub 2. The apertures 14 preferably constitute radially inwardly extending portions of the windows 7a for the coil springs 8. The radially outermost portion of the resilient component 12 is preferably provided with radially outwardly extending arms 12a which alternate with the arms 13 to thus ensure that the components 11 and 12 are coupled to each other for joint movement as considered in the circumferential direction of the collar 5. Since the radially outermost portion of the component 12 bears against the component 11, the latter is urged toward the inner side of the cheek 3 and bears against a ring-shaped friction pad 15 which is interposed between the inner side of the cheek 3 and the radially extending part of the component 11.

The width of the arms 13, as considered in the circumferential direction of the component 11, is less than the width of the corresponding apertures 14. Thus, when the carrier 7 begins to rotate and turns relative to the hub 2 by simultaneously stressing the coil springs 8, the friction generating unit 9 remains ineffective during the first stage of such rotation of the carrier 7 relative to the hub 2 (or vice versa). When the play between the arms 13 and the oncoming surface portions bounding the respective apertures 14 is eliminated, the component 11 begins to rotate with the carrier 7 relative to the hub 2 and thereby causes the friction pad 15 to slide along the inner side of the cheek 3 on the hub 2. Thus, the unit 9 then establishes and maintains friction between the pad 15 and the cheek 3, i.e., between the two assemblies of the clutch plate 1. At the same time, the radially innermost portion of the component 12 is in frictional engagement with and slides along the inner side of the cheek 4.

In order to ensure that the friction generating component 11 invariably reassumes a predetermined angular position relative to the cheek 3 when the clutch plate 1 is not in use, i.e., when the coil springs 8 are free to expand, the component 11 is provided with radially outwardly extending projections or prongs 16 which alternate with relatively wide slots. Each projection 16 is outwardly adjacent to one end convolution of the respective coil spring 8 so that, when the coil springs 8 are free to expand, they invariably return the component 11 to a predetermined starting angular position with reference to the cheek 3. It is not necessary to provide a discrete projection 16 for each coil spring 8, i.e., a single projection 16 will suffice to ensure automatic return movement of the component 11 to the aforementioned starting angular position with reference to the assembly including the cheek 3.

It will be noted that, as considered in the axial direction of the hub 2 and in a direction from the right to the left, as viewed in the drawing, the cheek 3 is followed by the friction generating component 11 which is followed by the carrier 7 which, in turn, is followed by the resilient component 12 which is followed by the cheek 4. The just enumerated parts need not constitute all elements of the clutch plate 1; for example, the latter can further include the parts of the friction generating unit 10. If desired, the improved clutch plate can be modified in such a way that the friction generating unit 10 is effective when the friction generating unit 9 is ineffective, and vice versa. In other words, the arrangement may be such that the friction generating unit 9 is effective during one stage of angular movement of the carrier 7 relative to the hub 2, and the friction generating unit 10 is effective during another stage of angular movement of the carrier 7 relative to the hub 2 or vice versa.

The characteristics (including the material and thickness) of the friction pad 15 between the component 11 and the cheek 3 can be readily selected in such a way that the friction generating unit 9 furnishes a predetermined optimum damping action. The pad 15 may be secured to the radially innermost portion of the component 11. If desired, the friction generating unit 9 can comprise an additional friction pad which is interposed between the radially innermost portion of the component 12 and the inner side of the cheek 4. The provision of a friction pad having predetermined characteristics promotes the possibility of selecting the friction between the component 12 and the cheek 4 with a high degree of accuracy.

If the radially outermost portion of the component 12 is provided with axially extending arms which pass with angular clearance through the apertures 14 of the carrier 7, the arms 13 of the component 11 can be omitted. The arms of the component 12 then bear directly against the component 11 at the right-hand side of the carrier 7, as viewed in the drawing.

The friction generating unit 10 is disposed within the confines (i.e., radially inwardly) of the friction generating unit 9 and, as mentioned above, ensures that friction prevails between the two assemblies of the clutch plate during each and every stage of angular movement of the carrier 7 relative to the hub 2 and/or vice versa. The unit 10 comprises a relatively wide first ring-shaped friction pad 17 which is interposed between one side of the carrier 7 and the cheek 3, and a second ring-shaped friction pad 18 which is adjacent to the other side of the carrier 7. An axially stressed dished annular energy storing spring 19 of the friction generating unit 10 reacts against the inner side of the cheek 4 and urges the friction pad 18 against the left-hand side of the carrier 7, as viewed in the drawing. The spring 19 reacts against the cheek 4 to urge the friction pad 18 against the radially innermost portion of the carrier 7 which is movable axially of the hub 2 to urge the friction pad 17 against the inner side of the cheek 3. Thus, the two sides of the radially innermost portion of the carrier 7 are contacted by the friction pads 17 and 18 during each and every stage of operation of the friction clutch which embodies the improved clutch plate 1.

It goes without saying that an additional friction pad can be inserted between the spring 19 and the cheek 4, that the spring 19 can be interposed between the carrier 7 and the pad 18 (which then contacts the inner side of the cheek 4) and/or that the friction pad 17 can be placed between the carrier 7 and the cheek 4 (the spring 19 and the friction pad 18 are then installed between the carrier 7 and the cheek 3). It is further clear that the components 11 and 12 of the friction generating unit 9 can be respectively disposed at the left-hand side and at the right-hand side of the carrier 7, as viewed in the drawing. Still further, the friction pad 17 can be omitted if the radially innermost portion of the carrier 7 and/or cheek 3 is configurated in such a way that these parts are in direct engagement with one another under the bias of the axially stressed spring 19.

An important advantage of the improved clutch plate is that its constituents cannot wobble relative to each other, as considered in the axial direction of the hub 2, i.e., that the clutch plate does not rattle and/or generate other types of noise during any stage of operation of the clutch and/or during any stage of relative angular movement between the hub 2 and the carrier 7. Each of the two friction generating units 9 and 10 is capable of furnishing a predictable and optimal frictional resistance to angular movement of the carrier 7 relative to the hub 2 and/or vice versa.

Another important advantage of the improved clutch plate is that it can be manufactured and assembled at a relatively low cost and of extremely simple parts which can be mass-produced in available machinery. Thus, if the clutch plate is furnished only with the friction generating unit 9, the components 11 and 12 of such unit can be mass-produced at a low or reasonable cost and can be installed in certain types of existing clutch plates to reduce the likelihood of rattling and/or other noise. Moreover, the parts of the friction generating unit 9 and/or 10 occupy very little room, as considered in the axial direction of the clutch plate.

A further important advantage of the improved clutch plate is that the provision of the friction generating unit 10 and/or 9 does not unduly increase the radial dimensions of the clutch plate. This is desirable and advantageous because the inertia of the clutch plate should be low and, as a rule, the inertia increases with increasing radial dimensions of the clutch plate. The outer friction generating unit 9 need not extend radially outwardly beyond the outermost portions of the energy storing springs 8 and, as shown in the drawing, the unit 9 can actually find place radially inwardly of the springs 8.

The compactness of the improved clutch plate 1 is enhanced due to the fact that one of the components 11, 12 of the friction generating unit 9 extends through the carrier 7 and directly engages the other of these components. The weight of the components 11 and 12 contributes little to the weight of the entire clutch plate; this is attributed, at least in part, to the fact that the components 11 and 12 are dimensioned with a view to find room within the confines of energy storing coil springs 8, i.e., close to the hub 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch plate, particularly for use in clutches for automotive vehicles, comprising a rotatable hub having two spaced-apart cheeks; a friction lining carrier interposed between and rotatable within limits relative to said cheeks; energy storing means interposed between said hub and said carrier to yieldably oppose angular movements between the carrier and said cheeks; a first friction generating unit interposed in the path of transmission of torque between said hub and said carrier and located intermediate said cheeks; and a second friction generating unit interposed in the path of transmission of torque between said carrier and said hub and located between said cheeks, said second unit comprising an axially resilient component and a friction generating component, said components being disposed at the opposite sides of said carrier and being in direct engagement with one another, at least one of said components extending through said carrier and said resilient component reacting, at least indirectly, against said hub.

2. The clutch plate of claim 1, wherein said resilient component includes a dished annular spring which reacts against one of said cheeks.

3. The clutch plate of claim 1, wherein said resilient component has an outer portion and an inner portion, as considered in the radial direction of said hub, said outer portion bearing against said friction generating component and said inner portion reacting against one of said cheeks.

4. The clutch plate of claim 1, wherein said one component is said friction generating component.

5. The clutch plate of claim 4, wherein said carrier has apertures and said one component has arms extending through said apertures.

6. The clutch plate of claim 5, wherein said resilient component bears against the arms of said one component.

7. The clutch plate of claim 1, wherein said one component has arms extending through said carrier and non-rotatably coupling said one component to said other component.

8. The clutch plate of claim 7, wherein said one component is said friction generating component.

9. The clutch plate of claim 1, wherein one of said cheeks is followed by said friction generating component, said carrier, said resilient component and the other of said cheeks, as considered in the axial direction of said hub.

10. The clutch plate of claim 1, further comprising a friction pad interposed between said friction generating component and one of said cheeks.

11. The clutch plate of claim 1, wherein one of said components comprises means cooperating with said energy storing means to return such one component to a predetermined angular position with reference to said carrier under the action of said energy storing means when one of the parts including said hub and said carrier ceases to transmit torque to the other of said parts.

12. A clutch plate, particularly for use in clutches for automotive vehicles, comprising a rotatable hub having two spaced-apart cheeks; a friction lining carrier interposed between and rotatable within limits relative to said cheeks; energy storing means interposed between said hub and said carrier to yieldably oppose angular movements between the carrier and said cheeks; a first friction generating unit interposed in the path of transmission of torque between said hub and said carrier and including a first member constituting a friction pad and a second member constituting an energy storing device; and a second friction generating unit interposed in the path of transmission of torque between said carrier and said hub, said second unit comprising an axially resilient component and a friction generating component, said components being disposed at the opposite sides of said carrier and being in direct engagement with one another, at least one of said components extending through said carrier and said resilient component reacting against said hub and constituting an annulus which surrounds at least one of said members.

13. A clutch plate, particularly for use in clutches for automotive vehicles, comprising a rotatable hub having two spaced-apart cheeks; a friction lining carrier interposed between and rotatable within limits relative to said cheeks; energy storing means interposed between said hub and said carrier to yieldably oppose angular movements between the carrier and said cheeks; a first friction generating unit interposed in the path of transmission of torque between said hub and said carrier, said unit comprising at least one friction pad and resilient means for biasing said pad axially of said hub, said pad being disposed between said carrier and one of said cheeks; and a second friction generating unit interposed in the path of transmission of torque between said carrier and said hub, said second unit comprising an axially resilient component and a friction generating component, said components being disposed at the opposite sides of said carrier, being in direct engagement with one another and constituting annuli surrounding said first unit, at least one of said components extending through said carrier and said resilient component reacting against said hub.

14. The clutch plate of claim 12, wherein said carrier is movable axially of said hub between said cheeks and said first unit includes two friction pads disposed at the opposite sides of said carrier.

15. The clutch plate of claim 14, wherein said resilient means is an annular spring reacting against one of said cheeks to urge one of said pads against said carrier whereby said carrier urges the other of said pads against the other of said cheeks.

* * * * *